US011485118B2

(12) United States Patent
Sawada et al.

(10) Patent No.: US 11,485,118 B2
(45) Date of Patent: Nov. 1, 2022

(54) RESIN MOLDED PRODUCT

(71) Applicant: AICELLO CORPORATION, Toyohashi (JP)

(72) Inventors: Shiro Sawada, Toyohashi (JP); Tomohiro Niimi, Toyohashi (JP)

(73) Assignee: AICELLO CORPORATION, Toyohashi (JP)

( * ) Notice: Subject to any disclaimer, the term of this patent is extended or adjusted under 35 U.S.C. 154(b) by 36 days.

(21) Appl. No.: 16/884,990

(22) Filed: May 27, 2020

(65) Prior Publication Data

US 2020/0283590 A1    Sep. 10, 2020

Related U.S. Application Data

(63) Continuation of application No. 16/307,896, filed as application No. PCT/JP2017/028826 on Aug. 8, 2017, now abandoned.

(30) Foreign Application Priority Data

Oct. 24, 2016 (JP) .............................. JP2016-208203
Aug. 4, 2017 (JP) .............................. JP2017-151897

(51) Int. Cl.
*B32B 27/18* (2006.01)
*B32B 27/08* (2006.01)
*B32B 27/20* (2006.01)
*B32B 27/32* (2006.01)
*C08J 5/18* (2006.01)
*C23F 11/02* (2006.01)
*C08K 5/09* (2006.01)

(52) U.S. Cl.
CPC .............. *B32B 27/18* (2013.01); *B32B 27/08* (2013.01); *B32B 27/20* (2013.01); *B32B 27/32* (2013.01); *C08J 5/18* (2013.01); *C23F 11/02* (2013.01); *B32B 2264/10* (2013.01); *B32B 2439/00* (2013.01); *C08J 2323/06* (2013.01); *C08K 5/09* (2013.01); *Y10T 428/1334* (2015.01); *Y10T 428/1352* (2015.01)

(58) Field of Classification Search
CPC ......... C08J 5/18; C08J 2323/06; B32B 27/18; B32B 27/08; B32B 27/20; B32B 27/32; B32B 2264/10; B32B 2439/00; C23F 11/02; Y10T 428/1334; Y10T 428/1352; C08K 5/09; C08K 5/098; C08K 2201/005
See application file for complete search history.

(56) References Cited

U.S. PATENT DOCUMENTS

| 2005/0019537 | A1 | 1/2005 | Nakaishi et al. |
| 2007/0145334 | A1 | 6/2007 | Numbu et al. |
| 2011/0086786 | A1* | 4/2011 | Ward .................. C10M 173/02 |
| | | | 508/136 |

FOREIGN PATENT DOCUMENTS

| CN | 1910237 A | 2/2007 |
| JP | S3927520 B | 12/1964 |
| JP | S45599 B1 | 1/1970 |
| JP | S61241341 A | 10/1986 |
| JP | S625852 A | 1/1987 |
| JP | 2007230568 A | 9/2007 |
| JP | 2007308726 A | 11/2007 |
| JP | 2008273121 A | 11/2008 |
| JP | 2011131923 A | 7/2011 |
| JP | 2011195602 A | 10/2011 |
| JP | 2012001799 A | 1/2012 |
| JP | 5025133 B2 | 9/2012 |
| JP | 2013007072 A | 1/2013 |
| JP | 2013059864 A | 4/2013 |
| JP | 2013213265 A | 10/2013 |
| JP | 5568753 B2 | 8/2014 |
| KR | 20120081789 A | 7/2012 |
| KR | 101214390 B1 | 12/2012 |
| WO | 2003066713 A1 | 8/2003 |
| WO | 2005068559 A1 | 7/2005 |
| WO | 2009054342 A1 | 4/2009 |

OTHER PUBLICATIONS

Machine Translation of JP 2013-7072 A (Year: 2013).*
Machine Translation of JP-2011-195602 A (Year: 2011).*
Final Office Action issued by U.S Patent and Trademark Office, dated Feb. 28, 2020, for related U.S. Appl. No. 16/307,896 (11 pages).
International Search Report (ISR) dated Sep. 5, 2017, issued for International application No. PCT/JP2017/028826 (2 pages).
Non-Final Office Action issued by U.S. Patent and Trademark Office, dated Aug. 28, 2019, for related U.S Appl. No. 16/307,896 (18 pages).
Notification Concerning Transmittal of International Preliminary Report on Patentability (PCT/IB326) and Notification of Transmittal of Translation of the International Preliminary Report on Patentability (PCT/IB/338) dated May 9, 2019, with International Preliminary Report on Patentability (PCT/IB/373) and Written Opinion of the International Searching Authority (PCT/ISA/237), for corresponding international application PCT/JP2017/028826, (20 pages).
Notification of Reasons for Refusal issued by Japanese Patent Office, dated Aug. 29, 2017, for counterpart Japanese application No. 2017-151897 (6 pages).

(Continued)

*Primary Examiner* — James C Yager
(74) *Attorney, Agent, or Firm* — Law Office of Katsuhiro Arai

(57) ABSTRACT

An object of the present invention is to achieve long-term anticorrosive effect for a wide range of articles such as iron castings, steel sheets, and galvanized steel sheets. As a means for achieving the object, the present invention provides a resin molded product structured in such a way that polyolefin resin layer 1 containing an ammonium salt of carboxylic acid, and polyolefin resin layer 2 containing a metal salt of aliphatic carboxylic acid, are stacked.

6 Claims, No Drawings

(56) References Cited

OTHER PUBLICATIONS

An Office Action issued by the German Patent Office, dated Apr. 8, 2021, for German counterpart application No. 112017002930.9. (5 pages).
A Second Office Action issued by the State Intellectual Property Office of China dated Jul. 28, 2022, for Chinese counterpart application No. 202010700785.9 (8 pages).
Packaging Materials Science, Jianqing Wang, editor-in-chief, p. 312, China Light Industry Press, Jan. 2009 (3 pages).

* cited by examiner

RESIN MOLDED PRODUCT

CROSS-REFERENCE TO RELATED APPLICATIONS

This application is a continuation of U.S. patent application Ser. No. 16/307,896, filed Dec. 6, 2018, which is the U.S. National Phase under 35 U.S.C. § 371 of International Application PCT/JP2017/028826, filed Aug. 8, 2017, which claims priority to Japanese Patent Application No. 2016-208203, filed Oct. 24, 2016, and No. 2017-151897, filed Aug. 4, 2017. The International Application was published under PCT Article 21(2) in a language other than English.

TECHNICAL FIELD

The present invention relates to a resin molded product.

BACKGROUND ART

As described in Patent Literature 1, corrosion inhibitor compositions containing alkyl ammonium salt of dicarboxylic acid as a volatile corrosion inhibitor as well as a water-soluble corrosion inhibitor, and corrosion inhibitor resin compositions produced by blending any of such corrosion inhibitor compositions in a thermoplastic resin, are known.

Also, as described in Patent Literature 2, packaging containers for metal products, which are constituted by a multi-layer sheet produced by bonding, by means of thermal lamination, a film containing a volatile corrosion inhibitor over a base resin sheet directly contacting the film, and then putting the thermal laminate through a secondary forming process in such a way that the resin film containing the volatile corrosion inhibitor comes to the metal product side, are in the public domain.

BACKGROUND ART LITERATURE

Patent Literature

Patent Literature 1: Japanese Patent Laid-open No. 2007-308726
Patent Literature 2: Japanese Patent Laid-open No. 2007-230568

SUMMARY OF THE INVENTION

Problems to be Solved by the Invention

It is possible to adopt a laminated sheet consisting of two layers as an anticorrosive film for storing metal products, etc., in order to demonstrate anticorrosive effect for a longer period; however, when an anticorrosive film having a resin layer that contains a volatile corrosion inhibitor and a water-soluble corrosion inhibitor is used, according to the invention described in Patent Literature 1, for example, it becomes difficult to control the release of volatile corrosion inhibitor during use, which in turn makes it difficult to sustainably release the corrosion inhibitor over a long period.

Also, as described in Patent Literature 2, the art of laminating a base material sheet on one side of a sheet that contains a volatile corrosion inhibitor, thereby demonstrating anticorrosive effect for a long period, is known.

However, sheets produced by this art are still unable to achieve long-term anticorrosive property, and there is a persistent call, even today, for long-term anticorrosive solutions for a wide range of articles such as iron castings, steel sheets, galvanized steel sheets, and the like.

Means for Solving the Problems

After studying in earnest to solve the aforementioned problems, the inventor of the present invention found a solution comprising the following means, and eventually completed the present invention.

1. A resin molded product structured in such a way that polyolefin resin layer 1 containing an ammonium salt of carboxylic acid, and polyolefin resin layer 2 containing a metal salt of aliphatic carboxylic acid, are stacked.
2. A resin molded product according to 1, wherein polyolefin resin layer 1 contains a metal salt of carboxylic acid.
3. A resin molded product according to 1 or 2, wherein polyolefin resin layer 2 contains a metal salt of nitrous acid.
4. A resin molded product according to any one of 1 to 3, wherein polyolefin resin layer 1 and/or 2 contains at least one of carboxylic acid, benzotriazole compound and tolyltriazole compound.
5. A resin molded product according to any one of 1 to 4, wherein the average particle size of the ammonium salt of carboxylic acid is 20 µm or greater.
6. A resin molded product according to any one of 1 to 5, wherein a base material layer is stacked.
7. A resin molded product according to any one of 1 to 6, wherein the resin molded product is a sheet-like object or bag-like object.
8. A resin molded product according to any one of 1 to 7, wherein the polyolefins used in polyolefin resin layers 1 and 2 are resins having the same density.

Effects of the Invention

According to the resin molded product containing an ammonium salt of carboxylic acid having a specific particle size as proposed by the present invention, a container or sheet-like object or bag-like object constituted at least partially by this molded product can, when used to store, or when packed together with, a metal product or other product that may rust, maintain anticorrosive effect for a longer period of time. As a result, rusting of metal products during transport, storage, etc., can be prevented for a longer period of time without fail.

MODE FOR CARRYING OUT THE INVENTION

The present invention represents a resin molded product comprising resin layer 1 and resin layer 2, and the invention also allows a base material layer to be provided with it depending on the situation.

Embodiments of the present invention are explained below.

(Ammonium Salt of Carboxylic Acid)

The ammonium salt of carboxylic acid under the present invention may be an ammonium salt of aliphatic carboxylic acid or ammonium salt of aromatic carboxylic acid.

Ammonium salts of carboxylic acids that may be used include ammonium salts of aliphatic carboxylic acids such as butyric acid, isobutyric acid, methacrylic acid, valeric acid, caproic acid, caprylic acid, capric acid, lauric acid, tridecylic acid, myristic acid, palmitic acid, stearic acid, sorbic acid, oleic acid, oleylic acid, isohexanoic acid, 2-methyl pentanoic acid, 2-ethyl butanoic acid, isoheptanoic acid, isooctanoic acid, 2-ethyl hexanoic acid, isononanoic acid, isodecanoic acid, 2-propyl heptanoic acid, isoundecanoic acid, isododecanoic acid, 2-butyl octanoic acid, bromic acid, malonic acid, succinic acid, glutaric acid, adipic acid, pimelic acid, suberic acid, azelaic acid, sebacic acid, undecane dicarboxylic acid, dodecane diacid, and the like, as well as ammonium salts of aromatic carboxylic acids such as benzoic acid, aminobenzoic acid, salicylic acid, p-tert-butyl benzoic acid, o-sulfobenzoic acid, 1-naphthoic acid, 2-naphthoic acid, phthalic acid, isophthalic acid, terephthalic acid, cinnamic acid, and the like, any one or more of which may be adopted.

Also, regarding resin layer 1, some ammonium salts of aliphatic carboxylic acids tend to bleed out to the surface of the resin molded product and thus negatively affect the appearance of the product; accordingly, adopting an ammonium salt of aromatic carboxylic acid may be preferable, in some cases, in terms of the appearance of the product.

The content of the ammonium salt of carboxylic acid is preferably 0.01 to 10 parts by weight, or more preferably 0.1 to 9 parts by weight, or yet more preferably 0.2 to 6 parts by weight, per 100 parts by weight of the resin layer in which it is contained. If the ammonium salt of carboxylic acid is contained by less than 0.01 part by weight, demonstrating sufficient anticorrosive property becomes difficult; if its content exceeds 10 parts by weight, on the other hand, forming becomes difficult.

The ammonium salt of carboxylic acid is contained in resin layer 1 in grain-like form, and its average particle size is 20 µm or greater, or preferably 20 to 400 µm, or more preferably 20 to 200 µm, or yet more preferably 20 to 100 µm. It should be noted that this average particle size is calculated based on the long diameters of the particles of ammonium salt of carboxylic acid contained in the resin layer, after removing the particles whose long diameter is 10 µm or smaller. Because fine particles may not contribute significantly to the maintenance of long-term anticorrosive property, the foregoing means that such fine particles are small in number and that many particles whose particle size is in a certain range are contained.

Furthermore, the maximum particle size of the ammonium salt of carboxylic acid contained in resin layer 1 is preferably 5000 µm or smaller, or more preferably 3000 µm or smaller, or yet more preferably 500 µm or smaller. If the particle size of the ammonium salt of carboxylic acid exceeds 5000 µm, the strength of the resin molded product may drop or the metal product may be contaminated due to detachment of particles, etc. The maximum particle size represents the largest particle size among the measured particle sizes of 1,000 particles.

When the average particle size or maximum particle size or both are within the aforementioned ranges, the resin-covered particles of ammonium salt of carboxylic acid form convex parts on the surface of resin layer 1. Presence of these convex parts allows more gas to be generated for use in preventing rust, which contributes to improvement of anticorrosive property. Also, these convex parts on the film surface have the effect of preventing adhesion to the article, etc., to be prevented from rusting, and they can also prevent contamination of the surface of the article to be prevented from rusting as a result of the particles of ammonium salt of carboxylic acid contacting the article directly.

However, a series of processes such as blending particles of ammonium salt of carboxylic acid in a resin that will constitute the resin layer, and then melting and kneading the resin to form it like a sheet, etc., for example, may break up the powder of ammonium salt of carboxylic acid, and its average particle size may decrease from the level before the blending. For this reason, the aforementioned average particle size under the present invention relates to the ammonium salt of carboxylic acid which is contained in resin layer 1 after resin layer 1 has been formed.

Because an ammonium salt of carboxylic acid whose particles have these specific sizes is contained, the generating quantity of the anticorrosive gas is controlled and consequently the anticorrosive effect can be maintained stably over a long period.

(Metal Salt of Carboxylic Acid)

Metal salts of carboxylic acids that can be contained in polyolefin resin layer 1 under the present invention include metal salts of aliphatic carboxylic acids and metal salts of aromatic carboxylic acids. In polyolefin resin layer 2 under the present invention, on the other hand, a metal salt of aliphatic carboxylic acid is contained.

These metal salts of carboxylic acids include metal salts such as sodium salts, potassium salts, calcium salts, magnesium salts, and the like, of aliphatic carboxylic acids such as isobutyric acid, methacrylic acid, valeric acid, caproic acid, caprylic acid, capric acid, lauric acid, tridecylic acid, myristic acid, palmitic acid, stearic acid, sorbic acid, oleic acid, oleylic acid, isohexanoic acid, 2-methyl pentanoic acid, 2-ethyl butanoic acid, isoheptanoic acid, isooctanoic acid, 2-ethyl hexanoic acid, isononanoic acid, isodecanoic acid, 2-propyl heptanoic acid, isoundecanoic acid, isododecanoic acid, 2-butyl octanoic acid, bromic acid, malonic acid, succinic acid, glutaric acid, adipic acid, pimelic acid, suberic acid, azelaic acid, sebacic acid, undecane dicarboxylic acid, dodecane diacid, and the like, as well as aromatic carboxylic acids such as benzoic acid, aminobenzoic acid, salicylic acid, p-tert-butyl benzoic acid, o-sulfobenzoic acid, 1-naphthoic acid, 2-naphthoic acid, phthalic acid, isophthalic acid, terephthalic acid, cinnamic acid, and the like, any one or more of which may be adopted.

Among the aforementioned metal salts of carboxylic acids, the metal salt of carboxylic acid contained in resin layer 1 accounts for preferably 0.001 to 10 parts by weight, or more preferably 0.01 to 5 parts by weight, per 100 parts by weight of resin layer 1 in which it is contained. If the metal salt of carboxylic acid is contained by less than 0.001 part by weight, demonstrating sufficient anticorrosive property becomes difficult; if its content exceeds 10 parts by weight, on the other hand, not only forming becomes difficult, but demonstrating long-term anticorrosive property also becomes difficult.

Among the aforementioned metal salts of carboxylic acids, the metal salt of aliphatic carboxylic acid contained in resin layer 2 accounts for preferably 0.001 to 10 parts by weight, or more preferably 0.01 to 5 parts by weight, per 100 parts by weight of resin layer 2 in which it is contained. If the metal salt of aliphatic carboxylic acid is contained by less than 0.001 part by weight, demonstrating sufficient anticorrosive property becomes difficult; if its content exceeds 10 parts by weight, on the other hand, not only forming becomes difficult, but demonstrating long-term anticorrosive property also becomes difficult. In addition, sufficient anticorrosive property does not manifest, either, if a metal salt of aromatic carboxylic acid is contained instead of a metal salt of aliphatic carboxylic acid.

It should be noted that a metal salt of aromatic carboxylic acid may be contained in resin layer 2 to the extent that it does not diminish the effects of the present invention.

(Carboxylic Acid)

The carboxylic acid under the present invention may be an aliphatic carboxylic acid or aromatic carboxylic acid.

These carboxylic acids include, among others, isobutyric acid, methacrylic acid, valeric acid, caproic acid, caprylic acid, capric acid, lauric acid, tridecylic acid, myristic acid, palmitic acid, stearic acid, sorbic acid, oleic acid, oleylic acid, isohexanoic acid, 2-methyl pentanoic acid, 2-ethyl butanoic acid, isoheptanoic acid, isooctanoic acid, 2-ethyl hexanoic acid, isononanoic acid, isodecanoic acid, 2-propyl heptanoic acid, isoundecanoic acid, isododecanoic acid, 2-butyl octanoic acid, bromic acid, malonic acid, succinic acid, glutaric acid, adipic acid, pimelic acid, suberic acid, azelaic acid, sebacic acid, undecane dicarboxylic acid, dodecane diacid, and other aliphatic carboxylic acids, as well as benzoic acid, aminobenzoic acid, salicylic acid, p-tert-butyl benzoic acid, o-sulfobenzoic acid, 1-naphthoic acid, 2-naphthoic acid, phthalic acid, isophthalic acid, terephthalic acid, cinnamic acid, and other aromatic carboxylic acids, any one or more of which may be adopted.

The content of such carboxylic acid is preferably 0.001 to 10 parts by weight, or more preferably 0.01 to 5 parts by weight, per 100 parts by weight of the resin layer in which it is contained. If the carboxylic acid is contained by less than 0.001 part by weight, further improving the anticorrosive property becomes difficult; if its content exceeds 10.0 parts by weight, on the other hand, not only forming becomes difficult, but demonstrating long-term anticorrosive property also becomes difficult.

(Benzotriazole Compound/Tolyltriazole Compound)

For the benzotriazole compound/tolyltriazole compound under the present invention, one or more types selected from benzotriazole, 4-methyl benzotriazole, and 5-methyl benzotriazole, etc., may be adopted.

The content of such benzotriazole compound/tolyltriazole compound is preferably 0.001 to 10 parts by weight, or more preferably 0.01 to 5 parts by weight, per 100 parts by weight of the resin layer in which it is contained. If the benzotriazole compound/tolyltriazole compound is contained by less than 0.001 part by weight, further improving the anticorrosive property becomes difficult; if its content exceeds 10 parts by weight, on the other hand, not only forming becomes difficult, but demonstrating long-term anticorrosive property also becomes difficult.

(Metal Salt of Nitrous Acid)

For the metal salt of nitrous acid under the present invention, one or more types selected from sodium salt, potassium salt, calcium salt, and magnesium salt of nitrous acid, etc., may be adopted.

The content of such metal salt of nitrous acid is preferably 0.001 to 10 parts by weight, or more preferably 0.01 to 5 parts by weight, per 100 parts by weight of the resin layer in which it is contained. If the metal salt of nitrous acid is contained by less than 0.001 part by weight, further improving the anticorrosive property becomes difficult; if its content exceeds 10 parts by weight, on the other hand, not only forming becomes difficult, but demonstrating long-term anticorrosive property also becomes difficult.

(Resin Layers 1 and 2)

For the resin that constitutes each of resin layers 1 and 2, one or more types selected from polyolefin polymers, i.e., olefin homopolymers and/or copolymers using an olefin as a monomer may be used independently for each layer.

Olefins (olefin monomers) that may constitute these polyolefin polymers include ethylene, propylene, 1-butene, 3-methyl-1-butene, 1-pentene, 3-methyl-1-pentene, 4-methyl-1-pentene, 1-hexene, 1-octene, and the like. Accordingly, these polyolefin polymers may be ethylene polymers, propylene polymers, 1-butene polymers, 1-hexene polymers, 4-methyl-1-pentene polymers, and the like.

Any one of these polymers may be used alone, or two or more of them may be combined. In other words, a polyolefin polymer may be a mixture of various polymers.

Among the above, ethylene polymers include ethylene homopolymers (polyethylenes) and copolymers of ethylene and other monomer(s) (ethylene copolymers). Examples of ethylene homopolymers include low-density polyethylenes (LDPE), linear low-density polyethylenes (L-LDPE), medium-density polyethylenes (MIDPE), and high-density polyethylenes (HDPE).

Also, ethylene copolymers include ethylene-propylene copolymer, ethylene-1-butene copolymer, ethylene-1-pentene copolymer, ethylene-1-hexene copolymer, ethylene-1-octene copolymer, ethylene-4-methyl-1-pentene copolymer, and the like.

It should be noted that, while the ethylene units (ethylenic constitutional units) in the ethylene copolymer only need to account for 50% or more (normally no more than 99.999%) of all constitutional units, they may account for 80 to 99.999%, or 90 to 99.995%, or even 99.0 to 99.990%, of all constitutional units, for example.

Also, propylene polymers include propylene homopolymers (polypropylenes) and copolymers of propylene and other monomer(s) (propylene copolymers). Propylene copolymers include propylene-ethylene copolymer, propylene-1-butene copolymer, propylene-1-pentene copolymer, propylene-1-octene copolymer, and the like.

It should be noted that, while the propylene units (propylenic constitutional units) in the propylene copolymer only need to account for 50% or more (normally no more than 99.999%) of all constitutional units, they may account for 80 to 99.999%, or 90 to 99.995%, or even 99.0 to 99.990%, of all constitutional units, for example.

In addition, each polyolefin polymer may contain any constitutional unit due to a non-olefin monomer, to the extent that it does not have harmful effects on achieving the object of the present invention. Non-olefin monomers include unsaturated carboxylic acids (acrylic acid, methacrylic acid, etc.), unsaturated carboxylic acid esters (methyl acrylate, ethyl acrylate, butyl acrylate, methyl methacrylate, ethyl methacrylate, butyl methacrylate, dimethyl maleate, diethyl maleate, etc.), vinyl esters (vinyl acetate, vinyl propionate, fumaric acid, maleic anhydride, maleic acid monoester, etc.), and the like. Any one of the foregoing may be used alone, or two or more of them may be combined.

It should be noted that, preferably the constitutional units due to non-olefin monomers in the polyolefin polymer, if any, account for no more than 40% (normally 0.001% or more) of all constitutional units. For example, they may account for 0.001 to 25%, or 0.005 to 15%, or even 0.01 to 10%, of all constitutional units.

Preferably the density of the polyolefin resin is 0.880 to 0.950 g/cm$^3$ from the viewpoint of processability. Also, from the viewpoints of mechanical strength and processability, its melt flow rate (MFR) is preferably in a range of 1.0 to 10.0 g/10 min. As the resin has an appropriate viscosity during melt processing, the granular ammonium salt of carboxylic acid can be encased and covered in/with the resin, which makes it possible to prevent the corrosion inhibitor from detachment of the resin molded product.

Also, antiblocking agent (AB agent), lubricant, antioxidant, antistatic agent, UV absorbent, processability improving agent, and other known additives for resins may be added to resin layers 1 and 2, to the extent that they do not interfere with the effects of the present invention.

It should be noted that, according to the present invention, sufficient long-term anticorrosive property can be demonstrated without blending ionomer resins, or polyolefin resins containing function groups, in resin layer 1 or resin layer 2 for the purpose of retaining the corrosion inhibitor in the resin layer.

Also, resin layers 1 and 2 each independently have a thickness of 30 to 500 μm, or preferably a thickness of 30 to 200 μm.

Under the present invention, a molded product constituted only by resin layer 1 that contains only an ammonium salt of carboxylic acid still exhibits a certain level of long-term anticorrosive property; however, a molded product offering excellent anticorrosive property for a longer period of time can be obtained if one or more of metal salt of carboxylic acid, carboxylic acid, benzotriazole compound, and tolyltriazole compound is/are, simultaneously, further contained, although the reason for this is not clear and the specific outcome also varies depending on the type of the metal to be prevented from rusting.

In addition, the long-term anticorrosive property can be improved further by stacking resin layer 1 that contains an ammonium salt of carboxylic acid, and resin layer 2 that contains one or more of metal salt of aliphatic carboxylic acid, metal salt of nitrous acid, carboxylic acid, benzotriazole compound, and tolyltriazole compound. Although the detailed mechanism at work is unclear, probably the long-term anticorrosive effect manifests because convex parts are formed on the film surface when the particle size of the ammonium salt of carboxylic acid is adjusted to a specific range.

(Base Material Layer)

The resin molded product proposed by the present invention may further have a base material layer provided on the surface on resin layer 1 side and/or resin layer 2 side.

The base material layer is provided to add strength, as well as gas barrier property and water vapor barrier property, to the molded product under the present invention, and also to improve the feel, esthetics, and the like. For the material that constitutes the base material layer, any material may be adopted that does not inhibit the anticorrosive effect achieved by resin layers 1 and 2, but preferably such material offers excellent adhesion to the resins constituting resin layer 1 and resin layer 2. For this reason, materials that may be adopted for constituting the base material layer include the aforementioned resins usable for resin layer 1 and resin layer 2, resins offering excellent adhesion to resin layer 1 and resin layer 2, as well as woven fabrics, nonwoven fabrics, and paper.

If a resin is adopted, various known additives may be contained in the resin layer. Also, the resin layer may or may not be porous.

Regarding a method for forming a base material layer using such resin, it may be formed simultaneously when resin layer 1 and/or resin layer 2 is formed, or a method whereby a base material layer is formed separately from resin layer 1 and resin layer 2 and then stacked on top using any known means, may be adopted.

(Manufacturing and Use of Resin Molded Product Having Resin Layers 1 and 2)

A resin molded product having resin layers 1 and 2 is formed by any known means such as extrusion, inflation, vacuum forming, pressure forming, etc., and may have a desired shape such as film, sheet-like object, bag-like object, laminated sheet-like object, cylinder, or box. And, such resin molded product may be used so that its face on the resin layer 1 side is positioned on the inner side of a container or packaging sheet, or specifically on the side of the article to be stored or packaged and thus prevented from rusting; or, it may be used so that its face on the resin layer 2 side is positioned on the inner side of a container or packaging sheet, or specifically on the side of the article to be stored or packaged and thus prevented from rusting.

It should be noted that, under the present invention, the average particle size of the ammonium salt of carboxylic acid falls within a specified range. However, the ammonium salt of carboxylic acid tends to break up as it is added to the resin and kneaded together, and also in the forming process, and consequently its average particle size becomes smaller; accordingly, attention is required to ensure the average particle size falls within the range specified under the present invention after the forming.

When an ammonium salt of carboxylic acid having these specific particle sizes is contained, the generating quantity of the anticorrosive gas can be controlled and consequently the anticorrosive effect can be maintained stably over a long period.

Furthermore, the adoption of two resin layers allows moisture to permeate gradually into resin layer 2 or 1 from its surface, which ensures that the anticorrosive gas also generates gradually to maintain high anticorrosive effect more stably over a long period without having to add a carboxylic acid-modified polyolefin polymer, wax, nonionic surfactant, inorganic porous material, or other sustained anticorrosive action release agent.

Also, rusting of a wide range of articles such as iron castings, steel sheets, galvanized steel sheets, etc., can be prevented.

EXAMPLES

The present invention is explained more specifically using the Examples and Comparative Examples below.

It should be noted that the Examples represent modes of the present invention and the present invention is not limited to these examples.

The anticorrosive components shown in Table 1 were added to 100 parts by weight of a low-density polyethylene (Sumikathene F200, density=0.924 g/cm$^3$, MFR=2.0 g/10 minutes, manufactured by Sumitomo Chemical), after which the ingredients were stirred and mixed by hand, to prepare respective molding compounds. These compounds were then put through an inflation extrusion machine at a forming temperature of 150° C., to produce tube-like films. In Examples 1 to 13 and Comparative Examples 6 to 10, the samples were formed using a double-layer machine so that the two layers had an equal thickness. In Comparative Examples 1 to 5, the films were formed using a single-layer machine.

⊚ Anticorrosion Test

A. [Anticorrosion Test of Anticorrosive Film]

Each of the test pieces per C below was suspended by a nylon fishing line inside a frame of 100 mm long×100 mm wide×150 mm high, and the frame was gusset-sealed using each of the films produced.

This test setup was exposed in the test environment per B below for the specified period, after which the surface was evaluated for rusting condition based on the evaluation method per D below.

B. [Test Environment]

25° C., 70% RH: 4 hours

50° C., 95% RH: 4 hours

Transition time setting: 2 hours, for a total of 12 hours per cycle

Evaluated for long-term effect: 7, 14 days (14, 28 cycles)

C. [Test Pieces]
  Iron casting (JIS G 5501) Size: Ø30 mm×8 mm
  Steel sheet (JIS G 3141) Size: 1.2 mm×30 mm×50 mm
  Galvanized steel sheet (JIS H 8610) Size: 1.4 mm×30 mm×50 mm
D. [Anticorrosion Evaluation Criteria]
  ⊚: No rust or discoloration
  ○: Spot rust and slight discoloration
  Δ: Rusting or discoloration over less than 10% of the total area of the test piece
  x: Rust or discoloration over 10% or more but no more than 50% of the total area of the test piece
  xx: Rust or discoloration over 50% or more of the total area of the test piece

[Conditions for Measuring Average Particle Size of Ammonium Salt of Carboxylic Acid]

Resin layer 1 was photographed using a stereoscopic microscope LEICA DFC295, and measurement was performed based on the photographed data.

It should be noted that particles whose diameter was 10 μm or smaller were excluded from the target of measurement; accordingly, the term "average particle size" under the present invention refers to the value obtained by the formula below based on a population of 1,000 particles whose long diameter exceeds 10 μm.

Average particle size=(Total sum of long diameters of particles whose long diameter exceeds 10 μm)/Number of particles

TABLE 1

| | Resin layer 1 | Resin layer 2 | Thickness | Average particle size of ammonium salt | Maximum particle size of ammonium salt | Iron casting 7 days |
|---|---|---|---|---|---|---|
| Example 1 | Ammonium benzoate (1 part) | Sodium sebacate (1 part) | 100 μm | 28 μm | 420 μm | ⊚ |
| Example 2 | Ammonium benzoate (1 part) | Sodium sebacate (0.2 parts) | 100 μm | 60 μm | 840 μm | ⊚ |
| Example 3 | Ammonium benzoate (1 part) | Sodium caprylate (1 part) | 100 μm | 28 μm | 420 μm | ⊚ |
| | Sodium p-tert butyl benzoate (1 part) | | | | | |
| Example 4 | Ammonium adipate (1 part) | Sodium sebacate (1 part) Sodium nitrite (1 part) | 100 μm | 28 μm | 420 μm | ⊚ |
| Example 5 | Ammonium adipate (1 part) Benzotriazole (1 part) | Sodium sebacate (1 part) Benzoic acid (1 part) | 100 μm | 28 μm | 420 μm | ⊚ |
| Example 6 | Ammonium benzoate (1 part) | Sodium sebacate (1 part) | 100 μm | 13 μm | 20 μm | ⊚ |
| Example 7 | Ammonium benzoate (1 part) | Sodium sebacate (1 part) | 100 μm | 21 μm | 45 μm | ⊚ |
| Example 8 | Ammonium benzoate (1 part) | Sodium sebacate (1 part) | 100 μm | 200 μm | 1500 μm | ⊚ |
| Example 9 | Ammonium benzoate (1 part) | Sodium sebacate (1 part) | 100 μm | 400 μm | 3000 μm | ⊚ |
| Example 10 | Ammonium benzoate (1 part) | Sodium sebacate (1 part) | 100 μm | 500 μm | 5000 μm | ⊚ |
| Example 11 | Ammonium benzoate (1 part) Sodium p-tert butyl benzoate (1 part) | Sodium caprylate (1 part) | 100 μm | 13 μm | 20 μm | ⊚ |
| Example 12 | Ammonium adipate (1 part) | Sodium sebacate (1 part) Sodium nitrite (1 part) | 100 μm | 13 μm | 20 μm | ⊚ |
| Example 13 | Ammonium adipate (1 part) Benzotriazole (1 part) | Sodium sebacate (1 part) Benzoic acid (1 part) | 100 μm | 13 μm | 20 μm | ⊚ |
| Comparative example 1 | Ammonium benzoate (1 part) + Sodium sebacate (1 part) | | 100 μm | 28 μm | 420 μm | ⊚ |
| Comparative example 2 | Ammonium benzoate (1 part) | | 100 μm | 28 μm | 420 μm | ○ |
| Comparative example 3 | Sodium sebacate (1 part) | | 100 μm | — | — | X X |
| Comparative example 4 | Benzotriazole (1 part) | | 100 μm | — | — | X X |
| Comparative example 5 | No additive | | 100 μm | — | — | X X |
| Comparative example 6 | Cyclohexyl amine carbamate (1 part) | Sodium benzoate (1 part) | 100 μm | — | — | X X |
| Comparative example 7 | Diisopropyl ammonium nitrite (1 part) | Sodium benzoate (1 part) | 100 μm | — | — | X X |
| Comparative example 8 | Benzotriazole (1 part) | Sodium benzoate (1 part) | 100 μm | — | — | X X |
| Comparative example 9 | Ammonium benzoate (1 part) | Sodium p-tert butyl benzoate (1 part) | 100 μm | 28 μm | 420 μm | ○ |
| Comparative example 10 | Ammonium adipate (1 part) | Sodium benzoate (1 part) | 100 μm | 28 μm | 420 μm | Δ |

| | Resin layer 1 | Resin layer 2 | Iron casting 14 days | Steel sheet 7 days | Steel sheet 14 days | Galvanized steel sheet 7 days | Galvanized steel sheet 14 days |
|---|---|---|---|---|---|---|---|
| Example 1 | Ammonium benzoate (1 part) | Sodium sebacate (1 part) | ⊚ | ⊚ | ⊚ | ⊚ | ○ |
| Example 2 | Ammonium benzoate (1 part) | Sodium sebacate (0.2 parts) | ⊚ | ⊚ | ⊚ | ⊚ | ○ |
| Example 3 | Ammonium benzoate (1 part) Sodium p-tert butyl benzoate (1 part) | Sodium caprylate (1 part) | ⊚ | ⊚ | ⊚ | ⊚ | ○ |
| Example 4 | Ammonium adipate (1 part) | Sodium sebacate (1 part) Sodium nitrite (1 part) | ⊚ | ⊚ | ⊚ | ⊚ | ○ |
| Example 5 | Ammonium adipate (1 part) Benzotriazole (1 part) | Sodium sebacate (1 part) Benzoic acid (1 part) | ⊚ | ⊚ | ⊚ | ⊚ | ⊚ |
| Example 6 | Ammonium benzoate (1 part) | Sodium sebacate (1 part) | ○ | ⊚ | ⊚ | ⊚ | Δ |
| Example 7 | Ammonium benzoate (1 part) | Sodium sebacate (1 part) | ⊚ | ⊚ | ⊚ | ⊚ | ○ |
| Example 8 | Ammonium benzoate (1 part) | Sodium sebacate (1 part) | ⊚ | ⊚ | ⊚ | ⊚ | ○ |
| Example 9 | Ammonium benzoate (1 part) | Sodium sebacate (1 part) | ⊚ | ⊚ | ⊚ | ⊚ | ○ |
| Example 10 | Ammonium benzoate (1 part) | Sodium sebacate (1 part) | ○ | ⊚ | ⊚ | ⊚ | Δ |
| Example 11 | Ammonium benzoate (1 part) Sodium p-tert butyl benzoate (1 part) | Sodium caprylate (1 part) | ○ | ⊚ | ⊚ | ⊚ | ○ |

TABLE 1-continued

| | | | | | | | |
|---|---|---|---|---|---|---|---|
| Example 12 | Ammonium adipate (1 part) | Sodium sebacate (1 part) Sodium nitrite (1 part) | ◎ | ◎ | ◎ | ◎ | ○ |
| Example 13 | Ammonium adipate (1 part) Benzotriazole (1 part) | Sodium sebacate (1 part) Benzoic acid (1 part) | ○ | ◎ | ◎ | ◎ | ◎ |
| Comparative example 1 | Ammonium benzoate (1 part) + Sodium sebacate (1 part) | | Δ | ◎ | ◎ | ◎ | Δ |
| Comparative example 2 | Ammonium benzoate (1 part) | | X | ◎ | ○ | ○ | Δ |
| Comparative example 3 | Sodium sebacate (1 part) | | X X | X X | X X | X | X |
| Comparative example 4 | Benzotriazole (1 part) | | X X | X X | X X | ◎ | ◎ |
| Comparative example 5 | No additive | | X X | X X | X X | X | X |
| Comparative example 6 | Cyclohexyl amine carbamate (1 part) | Sodium benzoate (1 part) | X X | ○ | X | ○ | Δ |
| Comparative example 7 | Diisopropyl ammonium nitrite (1 part) | Sodium benzoate (1 part) | X X | ○ | Δ | ○ | Δ |
| Comparative example 8 | Benzotriazole (1 part) | Sodium benzoate (1 part) | X X | X X | X X | ◎ | ◎ |
| Comparative example 9 | Ammonium benzoate (1 part) | Sodium p-tert butyl benzoate (1 part) | X | ◎ | ○ | ○ | Δ |
| Comparative example 10 | Ammonium adipate (1 part) | Sodium benzoate (1 part) | X X | ○ | Δ | ○ | Δ |

In each Example and Comparative Example, the additive quantities such as "1 part" represent additive quantities (based on part by weight) per 100 parts by weight of each resin layer. Also, each Example is an example of a molded product which is constituted by resin layer 1 (thickness 50 μm) and resin layer 2 (thickness 50 μm), stacked, and whose total thickness is 100 μm.

According to the result of Example 6, the evaluation of the 14-day test using iron casting was ○; however, when 1 part of ammonium benzoate and 1 part of sodium sebacate were added to one resin layer, as described in Comparative Example 1, the evaluation of the 14-day test using iron casting was Δ.

According to the results of Examples 1 to 5 and 7 to 10, sufficient anticorrosive property was demonstrated over 7 days for all of the iron castings, steel sheets, and galvanized steel sheets, when the average particle size of the ammonium salt of carboxylic acid was 20 μm or greater. These results were equivalent to the results of Examples 6 and 11 to 13 whose compositions were the same except for the particle size.

In particular, combining ammonium adipate and benzotriazole for resin layer 1, and combining sodium sebacate and benzoic acid for resin layer 2, as is the case of Example 5, resulted in excellent anticorrosive property over a long period for all of the iron castings, steel sheets, and galvanized steel sheets.

According to Comparative Examples 1 to 5 having only one layer, on the other hand, the test evaluations using iron castings, steel sheets, and galvanized steel sheets produced a poor result at least in the 7-day test or in the 14-day test.

Also, according to Comparative Examples 6 to 10 where resin layer 2 contained a metal salt of aromatic carboxylic acid instead of a metal salt of aliphatic carboxylic acid, the test evaluations were poor, at least for iron castings and steel sheets.

What is claimed is:

1. A resin molded product comprising a polyolefin resin layer 1 and a polyolefin resin layer 2 stacked together, wherein the polyolefin resin layer 1 and the polyolefin resin layer 2 contain an ammonium salt of benzoic acid, a benzotriazole compound, a carboxylic acid, and a metal salt of aliphatic carboxylic acid, wherein the ammonium salt of benzoic acid and the benzotriazole compound are allocated in the polyolefin resin layer 1, and the carboxylic acid and the metal salt of aliphatic carboxylic acid are allocated in the polyolefin resin layer 2, wherein the metal salt of carboxylic acid is any one or more of metal salts of aliphatic carboxylic acids selected from the group consisting of isobutyric acid, methacrylic acid, valeric acid, caproic acid, caprylic acid, capric acid, lauric acid, tridecylic acid, myristic acid, palmitic acid, stearic acid, sorbic acid, oleic acid, oleylic acid, isohexanoic acid, 2-methyl pentanoic acid, 2-ethyl butanoic acid, isoheptanoic acid, isooctanoic acid, 2-ethyl hexanoic acid, isononanoic acid, isodecanoic acid, 2-propyl heptanoic acid, isoundecanoic acid, isododecanoic acid, 2-butyl octanoic acid, bromic acid, malonic acid, succinic acid, glutaric acid, adipic acid, pimelic acid, suberic acid, azelaic acid, sebacic acid, undecane dicarboxylic acid, and dodecane diacid.

2. The resin molded product according to claim 1, wherein the carboxylic acid is an aromatic carboxylic acid.

3. The resin molded product according to claim 1, wherein an average particle size of the ammonium salt of benzoic acid is 20 μm or greater.

4. The resin molded product according to claim 1, wherein a base material layer is further stacked on a stack of the polyolefin resin layer 1 and the polyolefin resin layer 2.

5. The resin molded product according to claim 1, wherein the resin molded product is a sheet or bag.

6. The resin molded product according to claim 1, wherein polyolefins used in polyolefin resin layers 1 and 2 are resins having a same density.

* * * * *